United States Patent
Carlson et al.

(10) Patent No.: US 10,636,096 B1
(45) Date of Patent: Apr. 28, 2020

(54) DYNAMIC GENERATION OF AN ELECTRONIC IDENTIFICATION CARD FOR DISPLAY BY AN ELECTRONIC DEVICE BASED ON REAL-TIME POLICY INFORMATION

(71) Applicant: THE TRAVELERS INDEMNITY COMPANY, Hartford, CT (US)

(72) Inventors: Jeffrey F. Carlson, Ivoryton, CT (US); Flinn Mueller, Simsbury, CT (US); Michal W. Sterzycki, Manchester, CT (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 844 days.

(21) Appl. No.: 15/094,070

(22) Filed: Apr. 8, 2016

Related U.S. Application Data

(60) Provisional application No. 62/161,061, filed on May 13, 2015.

(51) Int. Cl.
*G06Q 40/00* (2012.01)
*G06Q 40/08* (2012.01)
(52) U.S. Cl.
CPC .................................. *G06Q 40/08* (2013.01)
(58) Field of Classification Search
USPC .......................................................... 705/4
See application file for complete search history.

(56) References Cited

U.S. PATENT DOCUMENTS

| 8,370,254 | B1 | 2/2013 | Hopkins, III et al. | |
|---|---|---|---|---|
| 9,325,807 | B1 * | 4/2016 | Meoli | H04L 67/42 |
| 9,384,491 | B1 * | 7/2016 | Briggs | G08G 1/205 |
| 2011/0320345 | A1 * | 12/2011 | Taveau | G06Q 20/32 |
| | | | | 705/39 |
| 2012/0042024 | A1 * | 2/2012 | Kirshenboim | H04L 51/18 |
| | | | | 709/206 |

OTHER PUBLICATIONS

Heading to campus with laptops, backpacks and prepaid cards St. Joseph News—Press; St. Joseph, Mo. [St. Joseph, Mo]Aug. 28, 2012.*

(Continued)

*Primary Examiner* — Hani M Kazimi
*Assistant Examiner* — Hatem M Ali
(74) *Attorney, Agent, or Firm* — Cantor Colburn LLP

(57) ABSTRACT

A system for dynamic generation of an electronic identification card based on real-time policy information is provided. The system includes a processing device and a memory device. The memory device stores instructions that when executed by the processing device may result in receiving a request for an electronic identification card. The system then selects a policy specific to the user based on an electronic device being associated with the user and retrieves policy information of the policy specific to the user in response to the receiving of the request for the electronic identification card and to the selecting of the policy specific to the user. The system then compiles the electronic identification card that includes policy element fields, each policy element field presenting dynamic data elements specific to the user based on the policy information, and outputs to the electronic device associated with the user the electronic identification card.

24 Claims, 10 Drawing Sheets

(56) References Cited

OTHER PUBLICATIONS

Abstracts from the Society for Clinical Trials Annual Meeting, Miami, May 21-23, 2012 Clinical Trials; London vol. 9, Iss. 4, (Aug. 2012): 450-554.*
Where the Presidential Canadiates Stand The News Press; Fort Myers, Fla. [Fort Myers, Fla]Jan. 20, 2008: B.16.*

* cited by examiner

DYNAMIC GENERATION OF AN ELECTRONIC IDENTIFICATION CARD FOR DISPLAY BY AN ELECTRONIC DEVICE BASED ON REAL-TIME POLICY INFORMATION

BACKGROUND

Insurance companies typically provide policy holders with an insurance identification card, which may serve as proof of insurance and provide basic policy and contact information. When a consumer purchases an insurance policy, the underwriting insurance company often issues a paper insurance identification card and sends the paper insurance identification card to the consumer via a postal or parcel service. The paper identification card includes information with respect to the insurance policy at the time of purchase and can be a useful item when the consumer, i.e., the insured, physically possesses the paper insurance identification card.

However, paper insurance identification cards have a number of limitations. For example, any change in the insurance policy immediately renders the most recently issued paper insurance identification card useless. In turn, reissuing and mailing any subsequent paper insurance identification card is a slow process during which the insured may need the subsequent paper insurance identification card. Further, if the insured does not physically possess a current paper insurance identification card (e.g., whether the paper insurance identification card was intentionally left behind or the insured is awaiting its arrival in the mail) at a time of need, the issuing and mailing of the paper insurance identification card will be perceived by the insured as providing no benefit.

In addition, companies, such as insurance companies, spend significant time and incur substantial expenses servicing consumer or insured requests for paper identification cards or paper insurance identification cards. Thus, it would be desirable for policy holders and for insurance companies if an alternate mechanism existed for providing access to real-time policy information of an insurance policy.

BRIEF DESCRIPTION OF THE DRAWINGS

The subject matter is particularly pointed out and distinctly claimed in the claims at the conclusion of the specification. The features and advantages of the invention are apparent from the following detailed description taken in conjunction with the accompanying drawings in which:

DETAILED DESCRIPTION

According to an embodiment, a card management system and method is provided. In general, the card management system and method leverages system data to perform dynamic generation of an electronic identification card based on real-time policy information. The card management system and method can retrieve (e.g., read in) the real-time policy information specific to a user and compile the electronic identification card by inserting the policy information as dynamic data elements into policy element fields of the electronic identification card. The electronic identification card may then be output to a user device and/or accessed at some later time by the user from the user device.

Further, because each policy element field is configured to present the dynamic data elements and because the dynamic data elements are based on at least the policy information, the card management system and method can automatically detect policy information updates and actively alter (via push or pull methods) the dynamic data elements to reflect the policy information updates. In this way, the card management system and method enables a service provider, such as an insurance company, to deliver current policy information to users on demand.

The card management system and method significantly enhances computer systems by providing an automatic mechanism for providing real-time policy information from a network-accessible database to consumers through user devices. That is, the card management system and method generally comprises computer readable instructions for accessing, downloading, viewing, messaging, transferring, and printing of electronic identification cards, along with quick, direct access to assistance services, which would otherwise not exist on the computer systems. The computer readable instructions are executable by a processor and stored on a memory, such that the card management system and method can operate within a computing environment that includes one or more management computers, one or more user computing devices, and/or one or more databases that can communicate via a network (each of which is further described below). The card management system and method is necessarily rooted in this computing environment to perform proactive operations to overcome problems specifically arising with respect to paper identification cards (e.g., the card management system and method eliminates the need for paper identification cards and, in turn, removes the time and expense associated with servicing paper identification card requests).

Figure 1:
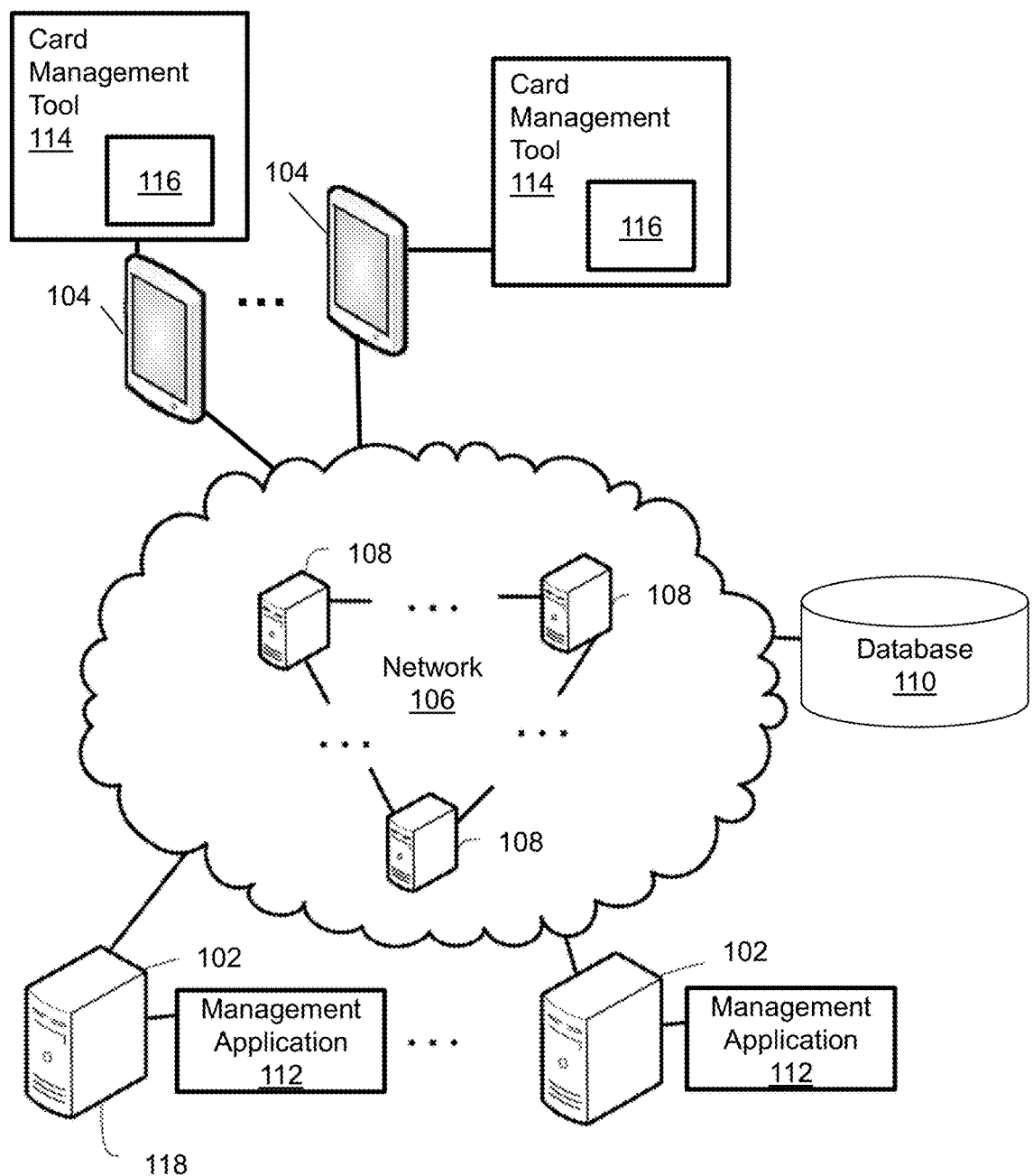
FIG. 1 depicts a block diagram of a system according to some embodiments.

Turning now to FIG. 1, a system 100 is depicted upon which a card management method/process may be implemented. The system 100 comprises one or more management computer systems 102 and one or more user devices 104 that can communicate via a network 106. The network 106 may be a cloud-computing network that comprises a plurality of servers 108 (e.g., cloud servers) operable to access a database 110. The database 110 may comprise a network-accessible database, such as a cloud-based database, that stores system data including real-time policy information. The database 110 can be read from and written to by the management computer systems 102 and the user devices 104. Each of the management computer systems 102 may have a management application 112 that provides a management user interface for accessing the database 110 and communicating with the user devices 104, and each of the user devices 104 may have a card management tool 114 that provides a card management user interface for accessing the database 110 and presenting at least one electronic identification card 116. Through these interfaces, one or more users of the management computer systems 102 and the user devices 104 may generate and present the at least one electronic identification card 116 containing the real-time policy information.

In one example, the management application 112 may comprise an application provided by a service provider (e.g., an insurance company) that can leverage the system data of the database 110 to perform dynamic generation of the electronic identification card 116. The management application 112 can perform dynamic generation of the electronic identification card 116 based on the real-time policy information within the system data, which includes inserting the real-time policy information as dynamic data elements into policy element fields of the electronic identification card 116. Further, the management application 112 can transmit the electronic identification card 116 and/or the dynamic data elements to a user (e.g., an insured) via any corresponding user device 104.

The card management tool 114 can report information to the management application 112 (e.g., report user device location, card requests, etc., to an insurance company). The reporting of the information by the card management tool 114, along with sending requests for the electronic identification card 116, can assist in performing the dynamic generation of the electronic identification card 116.

The management application 112 and/or the card management tool 114 create a mechanism to read in the real-time policy information specific to a user, compile at least one electronic identification card 116 by inserting the real-time policy information as dynamic data elements into policy element fields of the electronic identification card 116, and provide up-to-date electronic identification cards 116 at any time or by request. The card management tool 114 may be particularly advantageous for time-critical needs, such as when an insured is involved in an accident and needs current policy information, along with local vehicle service numbers.

In general, the management computer systems 102 and the user devices 104 are computing systems. Examples of the management computer systems 102 include personal computers (e.g., laptop, desktop, etc.), workstations, and/or server that can access data in the database 110 and communicate with one or more of the user devices 104. Examples of the user devices 104 include any type of computing devices (i.e., electronic devices) capable of executing the card management tool 114 and interfacing with the network 106, such as personal computers, tablet computers, smartphones, notebook computers, netbook computers, wearable devices (e.g., glasses, watches), and the like. The cloud servers 108 can be any type of computing node operable to support networking functions of the network 106, including a combination of physical and virtual machines.

In the example of FIG. 1, each of the management computer systems 102, the user devices 104, and the cloud servers 108 can include a processor (e.g., a processing device, such as one or more microprocessors, one or more microcontrollers, and/or one or more digital signal processors) that receives instructions (e.g., from memory or like device), executes those instructions, and performs one or more processes defined by those instructions. Instructions may be embodied, for example, in one or more computer programs and/or one or more scripts. Each of the management computer systems 102, the user devices 104, and the cloud servers 108 can include a local data storage device, such as a memory device, to store instructions and data. A memory device, also referred to herein as "computer-readable memory" (e.g., non-transitory memory devices as opposed to transmission devices or media), may generally store program instructions, code, and/or modules that, when executed by a processing device, cause a particular machine to function in accordance with one or more embodiments described herein. In one example, at least one of the management computer systems 102 and the user devices 104 executes computer instructions for implementing the exemplary processes described herein. Although only the management application 112 and the card management tool 114 are depicted in FIG. 1, it will be understood that each of the management computer systems 102, the user devices 104, and the cloud servers 108 can execute a number of other programs, such as application programs and operating systems. The management application 112 and the card management tool 114 may each be further subdivided into a number of modules or sub-programs.

The network 106 may establish communication within the system 100 using a combination of networks, such as a wide area network (WAN), a local area network (LAN), a global network (e.g., Internet), a virtual private network (VPN), and/or an intranet. The network 106 may support fiber optic, wired, and/or wireless communication links. The network 106 can support transmission of digitized data including digitized images, video, audio, and/or other data types. Other networks (not depicted) can also be utilized by elements of the system 100, such as cellular communication, satellite communication, and other network types.

The database 110 may be implemented using a variety of devices for storing electronic information, such as the system data described above. It is understood that the database 110 may be implemented using memory contained in one or more of the cloud servers 108 or may be a separate physical system, as shown in FIG. 1. It will be understood that multiple storage devices may be employed to store the database 110. For example, the storage devices used to store the database 110 can be dispersed across the network 106, and each of the storage devices that collectively form the database 110 may be logically addressable as a consolidated data source across a distributed environment.

In some embodiments, the management computer systems 102 can be located at a common location or in a plurality of locations. In the example of FIG. 1, the management computer systems 102 are located at an office location from which an administrator may initiate a card management process. One of the management computer systems 102 used to send the electronic identification card 116 and/or the dynamic data elements to one or more of the user devices 104 may be referred to as an initiator system 118.

The management application 112 is one example of an application provided by an insurance company that can push or pull information (e.g., the electronic identification card 116 and/or the dynamic data elements) to a user/insured. That is, the management application 112 can track and monitor policy information via the database 110 for the insured and corresponding physical assets and communicate that policy information over the network 106 to the user devices 104. In other embodiments, the management application 112 can also send notifications to the user/insured at the time of a policy change (e.g., renewal or expiration of the policy), as well as receive location information from a user device 104 and provide location-specific information. In additional embodiments, the management application 112 can also encrypt the electronic identification card 116 and provide direct access to the database 110 through user interaction with the electronic identification card 116 without the entering of user credentials. Thus, the management application 112 creates a mechanism to provide real-time policy information from a network-accessible database to consumers through user devices 104.

The card management tool 114 stores and maintains the electronic identification card 116. The card management tool 114 presents the electronic identification card 116, along with any automatic real-time policy information received by the card management tool 114. The card management tool 114 can also provide, through the electronic identification card 116, tips for what to do in an unforeseen event and/or accident. The electronic identification card 116 can also enable linking to other claim or service applications or web sites.

The electronic identification card 116 is a data structure for storing and presenting policy information that relates to physical assets, which can be any type of property that has an associated risk of loss, damage, or liability. General categories of assets include real property and personal property. Examples of real property include, but are not limited to, commercial and residential property and associated structures. Examples of personal property include, but are not limited to, vehicles, such as cars, boats, aircraft, and personal watercraft, appliances, electronics, and other movable assets. The policy information is data in the form of sets of values of qualitative or quantitative variables, individual pieces of information, and/or unprocessed collections of characters, each of which can be represented in a data structure (e.g., the electronic identification card 116). The policy information can comprise information associated with the physical asset, such as insurance coverage, policy term, and primary policy holder; credentials or characteristics that describe the physical asset, such as condition, quality, age, color, size, shape, type, make, and model; images of the physical asset; geographic information associated with the physical asset, etc. The electronic identification card 116 can be sent via text, email, or the like to other users through the management application 112 and/or the card management tool 114. The electronic identification card 116 can also be one of a plurality of cards, each of which can correspond to the same policy and can be stored by one of the plurality of user devices 104. The plurality of cards may further be synchronized across the plurality of user devices 104 to ensure that each card presents the dynamic data elements specific to the insured based on the updated policy information.

Figure 2:
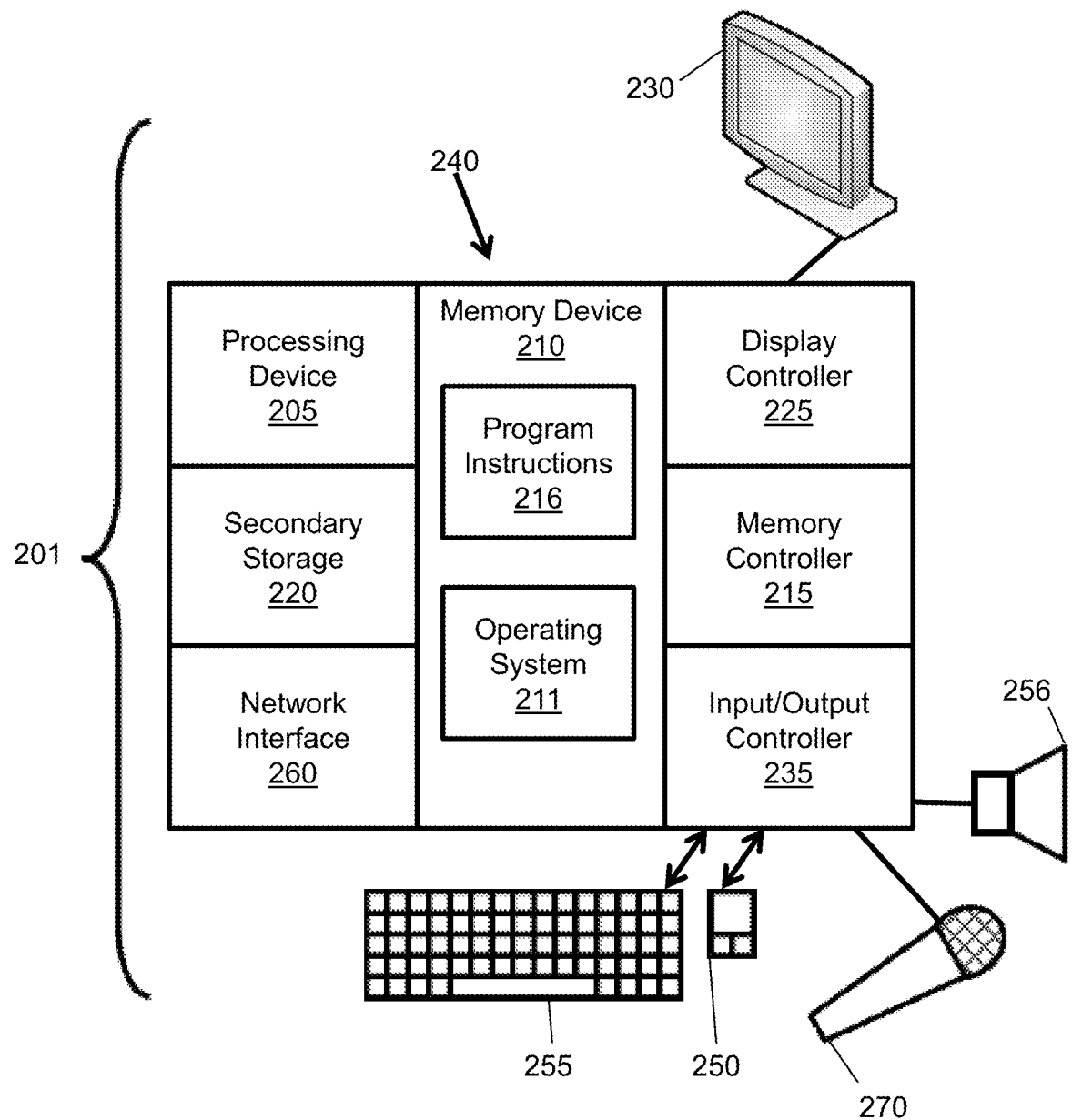
FIG. 2 depicts a block diagram of an initiator system according to some embodiments.

FIG. 2 depicts a block diagram of a system 200 according to an embodiment. The system 200 is depicted as a computer 201 and is an example of the management computer systems 102 of FIG. 1. The user devices 104 and cloud servers 108 of FIG. 1 can also include similar computer elements as depicted in the computer 201 of FIG. 2.

In an exemplary embodiment, in terms of hardware architecture, as shown in FIG. 2, the computer 201 comprises a processing device 205 and a memory device 210 coupled to a memory controller 215 and an input/output controller 235. The input/output controller 235 may comprise one or more buses or other wired or wireless connections, as is known in the art. The input/output controller 235 may have additional elements, which are omitted for simplicity, such as controllers, buffers (caches), drivers, repeaters, and receivers to enable communications. Further, the computer 201 may include address, control, and/or data connections to enable communications among the aforementioned components.

In an exemplary embodiment, a mouse 250 and a keyboard 255 or similar devices can be coupled to the input/output controller 235. Alternatively, input may be received via a touch-sensitive or motion sensitive interface (not depicted). The computer 201 can further include a display controller 225 coupled to a display 230. One or more speaker 256 and/or a microphone 270 can be coupled to the input/output controller 235 to support audio interactions with one or more of the user devices 104. In an embodiment, the computer 201 can support Voice over Internet Protocol (VoIP) or other communication protocols known in the art.

The processing device 205 comprises a hardware device for executing software, particularly software stored in secondary storage 220 or memory device 210. The processing device 205 can comprise any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can comprise any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette, or the like, etc.). Moreover, the memory device 210 may incorporate electronic, magnetic, optical, and/or other types of storage media. Accordingly, the memory device 210 is an example of a tangible computer readable storage medium 240 upon which instructions executable by the processing device 205 may be embodied as a computer program product. The memory device 210 can have a distributed architecture, where various components are situated remote from one another, but can be accessed by the processing device 205.

The instructions in memory device 210 may include one or more separate programs, each of which comprises an ordered listing of executable instructions for implementing logical functions. In the example of FIG. 2, the instructions in the memory device 210 include a suitable operating system (OS) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions of and/or instructions to implement the management application 112 of FIG. 1, where the system 200 is an embodiment of the management computer systems 102 of FIG. 1, and the card management tool 114 of FIG. 1, where the system 200 is an embodiment of the user devices 104 of FIG. 1.

The computer 201 of FIG. 2 also comprises a network interface 260 that can establish communication channels with one or more other computer systems via one or more network links. The network interface 260 can support wired and/or wireless communication protocols known in the art. For example, when embodied in one of the management computer systems 102 of FIG. 1, the network interface 260 can establish communication channels with one or more user devices 104 of FIG. 1 and/or the database 110 of FIG. 1 via the network 106 of FIG. 1.

Figure 3:
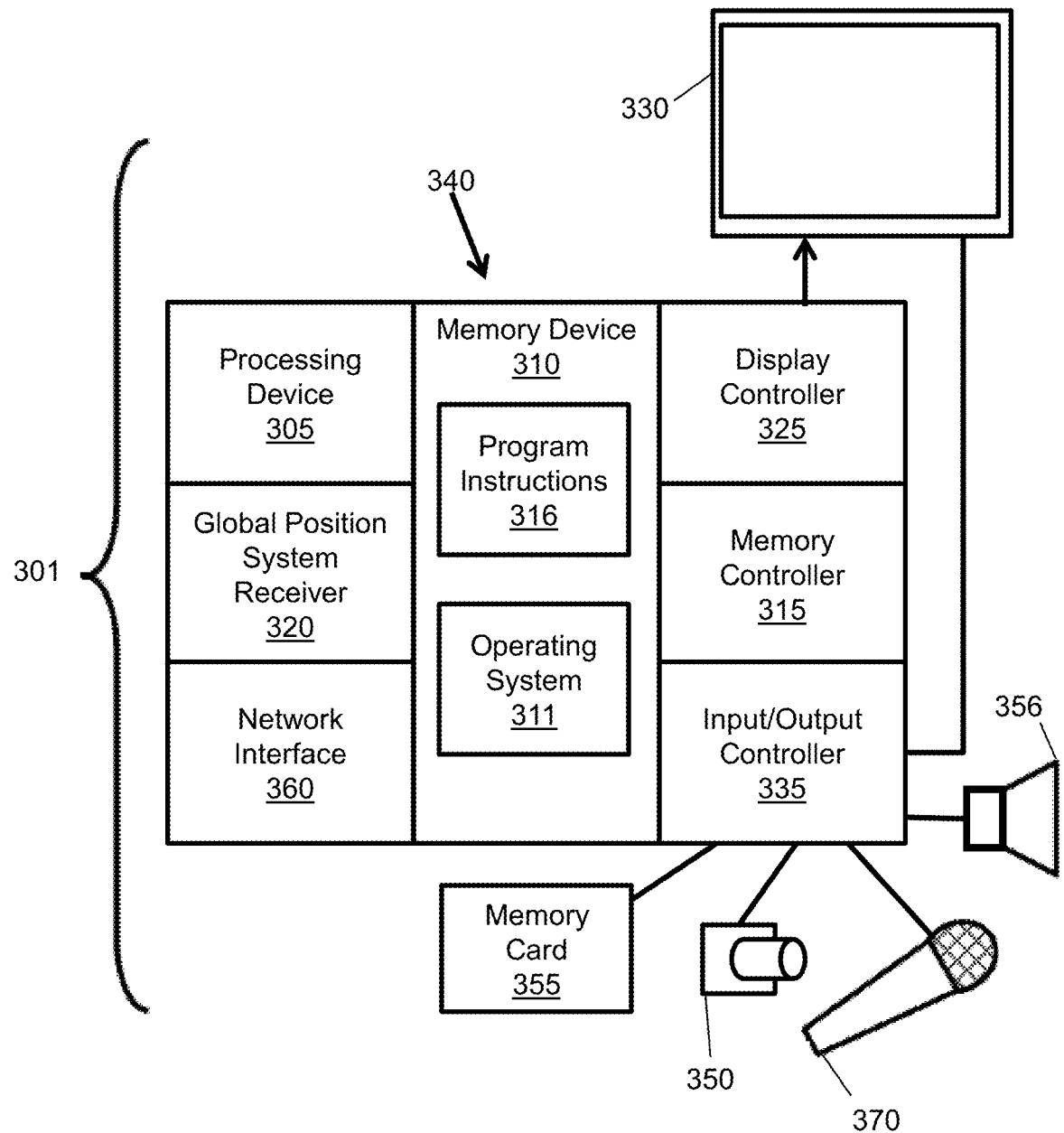
FIG. 3 depicts a block diagram of a mobile device according to some embodiments.

FIG. 3 depicts a block diagram of a system 300 according to an embodiment. The system 300 is depicted as a mobile computing device 301 in FIG. 3. The system 300 is an example of a user device 104 of FIG. 1. The servers 108, the management computer systems 102, and the database 110 of FIG. 1 can also include similar computer elements as those depicted in the mobile computing device 301 of FIG. 3.

In an exemplary embodiment, in terms of hardware architecture, as shown in FIG. 3, the mobile computing device 301 comprises a processing device 305 and a memory device 310 coupled to a memory controller 315 and an input/output controller 335. The input/output controller 335 can comprise one or more buses or other wired or wireless connections, as is known in the art. The input/output controller 335 may comprise additional elements, which are omitted for simplicity, such as controllers, buffers (caches), drivers, repeaters, and receivers to enable communications. Further, the mobile computing device 301 may comprise address, control, and/or data connections to enable communications among the aforementioned components.

In some embodiments, a touch-sensitive display 330 or similar device can be coupled to the input/output controller 335. Alternatively, input may be received via a keypad, keyboard, or motion sensitive interface (not depicted). The input/output controller 335 can receive image data via one or more integrated camera 350. Extended storage capacity for image data, video, and the like can be supported using a memory card 355 interfaced to the input/output controller 335. The input/output controller 335 may also be coupled to one or more speaker 356 and/or microphone 370 to support audio interactions with one or more of the management computer systems 102 and database 110 of FIG. 1. In an embodiment, the mobile computing device 301 can support VoIP, cellular transmissions, or other communication protocols known in the art. The mobile computing device 301 can further include a display controller 325 coupled to the touch-sensitive display 330. In an alternate embodiment, a standard video display is provided in place of the touch-sensitive display 330 and other inputs, such as a keyboard and touchpad, are used to provide input to the mobile computing device 301.

The processing device 305 comprises a hardware device for executing software, particularly software stored in memory device 310. The processing device 305 can comprise any custom made or commercially available computer processor, a central processing unit (CPU), an auxiliary processor among several processors associated with the mobile computing device 301, a semiconductor-based microprocessor (in the form of a microchip or chip set), a macro-processor, or generally any device for executing instructions.

The memory device 310 can comprise any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette or the like, etc.). Moreover, the memory device 310 may incorporate electronic, magnetic, optical, and/or other types of storage media. Accordingly, the memory device 310 is an example of a tangible computer readable storage medium 340 upon which instructions executable by the processing device 305 may be embodied as a computer program product. The memory device 310 can have a distributed architecture, where various components are situated remote from one another, but can be accessed by the processing device 305.

The instructions in memory device 310 may include one or more separate programs, each of which comprises an ordered listing of executable instructions for implementing logical functions. In the example of FIG. 3, the instructions in the memory device 310 include a suitable operating system (OS) 311 and program instructions 316. The operating system 311 essentially controls the execution of other computer programs and provides scheduling, input-output control, file and data management, memory management, and communication control and related services. When the mobile computing device 301 is in operation, the processing device 305 is configured to execute instructions stored within the memory device 310, to communicate data to and from the memory device 310, and to generally control operations of the mobile computing device 301 pursuant to the instructions. Examples of program instructions 316 can include instructions of and/or instructions to implement the management application 112 of FIG. 1, where the system 300 is an embodiment of the management computer systems 102 of FIG. 1, and the card management tool 114 of FIG. 1, where the system 300 is an embodiment of the user devices 104 of FIG. 1.

The mobile computing device 301 may also include a global position system (GPS) receiver 320. The GPS receiver 320 may be used to generate geotags to apply to information acquired and/or managed by the mobile computing device 301, such as image data (photos and/or video), audio data, and other data values recorded. Geotags identify a location, such as coordinates of the mobile computing device 301, of a user device 104 of FIG. 1, or of a physical asset. An internal clock (not depicted) can also provide date/time information with the geotag or as a separate data tag for assessment data, image data, and other data captured by the mobile computing device 301. For example, an insurance company can deliver current policy information requested by users, and utilize a geotag of the mobile computing device 301 to provide localized informational tips that populate the electronic identification card 116 of FIG. 1.

The mobile computing device 301 also includes a network interface 360 that can establish communication channels with one or more other computer systems via one or more network links. The network interface 360 can support wired and/or wireless communication protocols known in the art. For example, when embodied in one of the user devices 104 of FIG. 1, the network interface 360 can establish communication channels with one or more management computer systems 102 of FIG. 1 and/or the database 110 of FIG. 1 via the network 106 of FIG. 1. The network interface 360 may also support one or more other types of networks, such as a cellular network and/or satellite communication. In some embodiments, the network interface 360 supports communication protocols that enable the mobile computing device 301 to directly link with electronic systems, such as a security system, programmable thermostat, fire detection system, an in-vehicle network, a sensing system, and/or other localized device(s) or network(s) to acquire status and history information. For instance, the network interface 360 may support Wi-Fi, Bluetooth, near-field communication (NFC), radio frequency identification (RFID), and the like.

Figure 4:
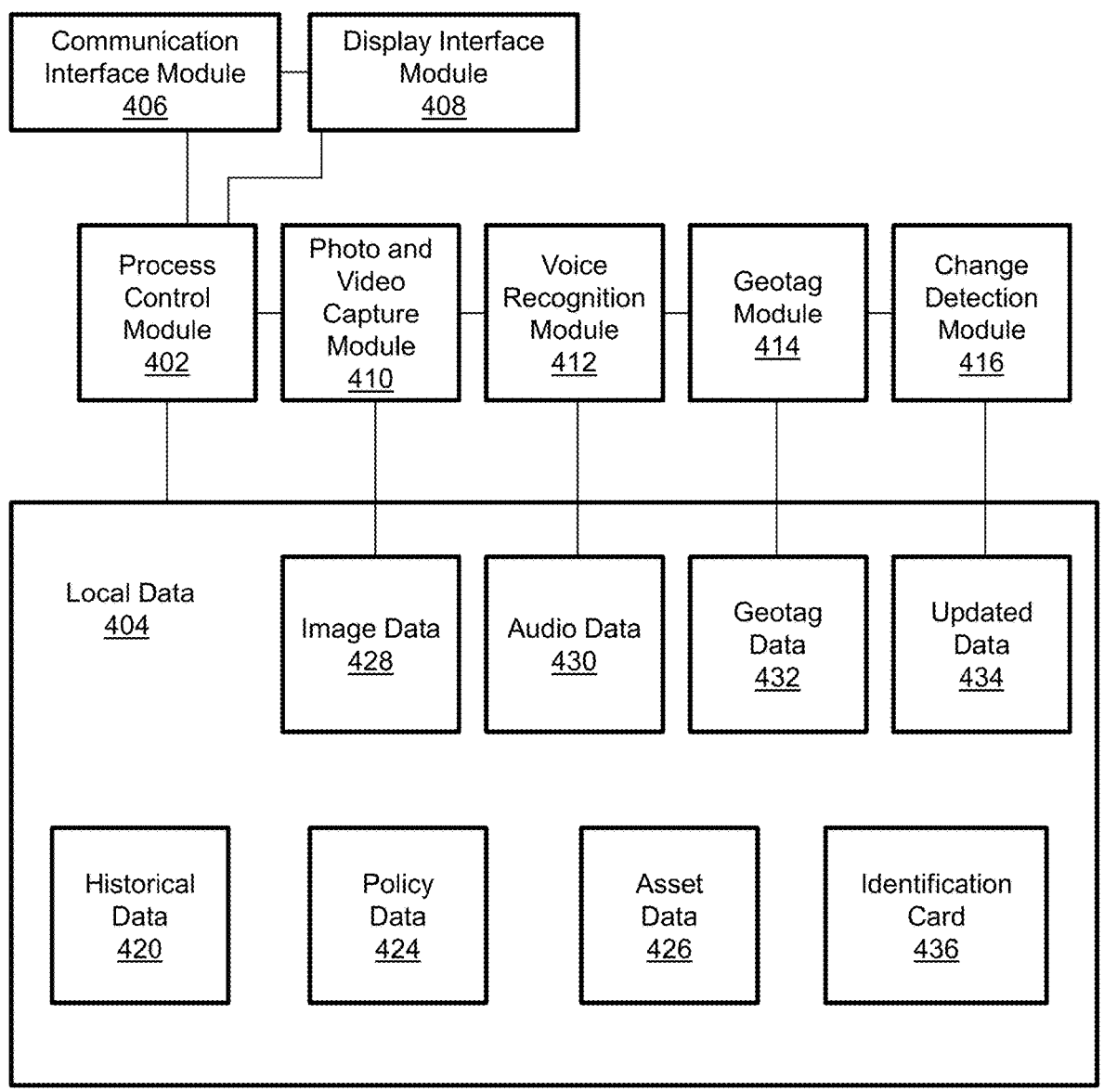
FIG. 4 depicts relationships between modules and data according to some embodiments.

FIG. 4 depicts relationships between modules and data in one of the user devices 104 of FIG. 1 according to some embodiments. In the example device 400 of FIG. 4, a plurality of modules 402, 406, 408, 410, 412, 414, and 416 implement functionality of the card management tool 114 of FIG. 1. The modules 402, 406, 408, 410, 412, 414, and 416 can be executable groups of the program instructions (e.g., 216 of FIG. 2 or 316 of FIG. 3) formatted as executable objects, scripts, functions, or the like using a programming language that is compatible with the operating system (e.g., 211 of FIG. 2 or 311 of FIG. 3). A process control module 402 can control sequencing of data acquisition and interactions with local data 404 that may be stored in the database 110 of FIG. 1, the memory device (e.g., 210 of FIG. 2 or 310 of FIG. 3) or memory card 355 of FIG. 3. The process control module 402 may interface with a communication interface module 406 that establishes external communication via the network interface (e.g., 260 of FIG. 2 or 360 of FIG. 3). The process control module 402 can also interface with a display interface module 408, a photo and video capture module 410, a voice recognition module 412, a geotag module 414, and a change detection module 416, each of which may be utilized, for example, to receive user feedback from the user in response to communications.

The local data 404 may include, for example, historical data 420, policy data 424, asset data 426 (e.g., physical asset data), image data 428, audio data 430, geotag data 432, updated data 434, an identification card 436, and other data (not depicted). The historical data 420 can comprise asset modification and/or status changes, along with a local copy of policy changes, over time with respect to each asset associated with the policy data 424. The policy data 424 can include policy information, such as assets insured, value insured, policy term, primary policy holder, etc. The physical asset data 426 can comprise record data itemizing a condition, quality, age, characteristics (e.g., color, size, shape, type, make, and model), etc., of the assets. The image data 428 can include photos and/or videos captured by, for example, sensors, security systems, and the integrated camera 350 of FIG. 3, and processed by the photo and video capture module 410. The audio data 430 can include data captured by, for example, sensors, security systems, and the microphone 370 of FIG. 3, and processed by the voice recognition module 412, which may convert the audio data 430 into text data for storage in the database 110 of FIG. 1. The geotag data 432 can include location data relevant to insured assets or otherwise associated with an insurance policy and can be populated by the geotag module 414 based on data from the GPS receiver 320 of FIG. 3. The geotag data 432 can be added to the image data 428 for inclusion in the database 110 of FIG. 1 or can be managed with respect to the policy data 424 and/or the electronic identification card 436. The updated data 434 can comprise changes detected by the change detection module 416 that correspond to real-time policy updates and/or conditions that affect the policy, such as expiration of the policy term. Further, the updated data 434 can include records associated with the other local data 404 (e.g., the image data 428, the audio data 430, the geotag data 432, etc.).

Figure 5:
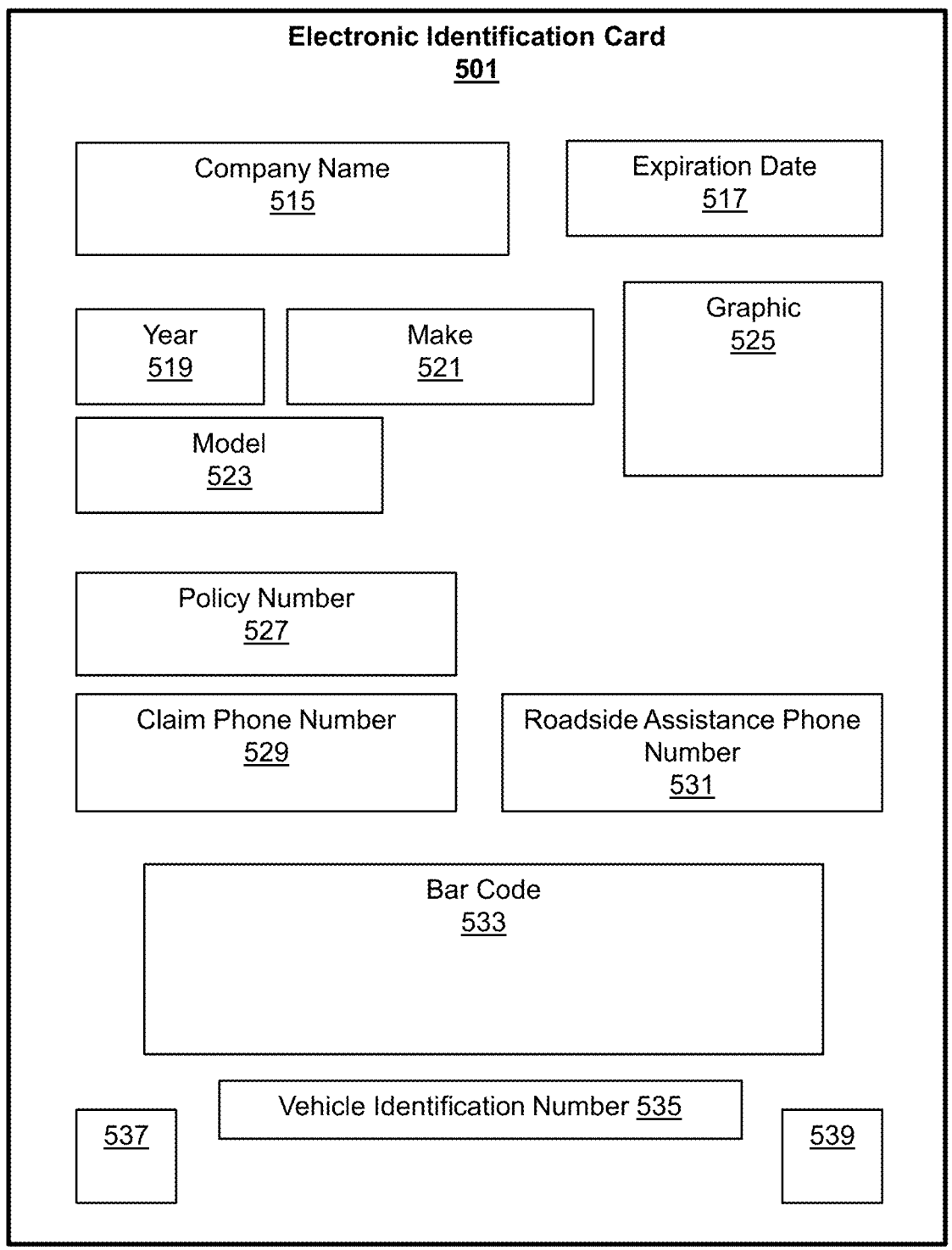
FIG. 5 depicts an example of user interface according to some embodiments.

FIG. 5 depicts an example of a user interface 500 of the card management tool 114 of FIG. 1. The user interface 500 further depicts an electronic identification card 501, which is a visual representation example of the electronic identification card 116 of FIG. 1. The electronic identification card 501 includes a plurality of policy element fields, where each policy element field is configured to present dynamic data elements specific to policy information for a specific policy and/or contract.

By way of example, the electronic identification card 501 comprises an electronic insurance card for a vehicle insurance policy of a vehicle owed by a user (e.g., the insured). It will be understood that embodiments of the invention can be utilized to deliver and customize the electronic identification card 501 in association with other types of insurance, such as life insurance, health insurance, and other types of property and casualty insurance. In turn, the plurality of policy element fields can include a company name 515, an expiration date 517, a year 519, a make 521, a model 532, a graphic 525, a policy number 527, a claim phone number 529, a roadside assistance phone number 531, a bar code 533, a vehicle identification number 535, and option buttons 537, 539.

The company name 515 can comprise a field that is populated by a dynamic data element corresponding to the name of the insurance company providing the vehicle insurance policy to the insured. The expiration date 517 can comprise a field that is populated by a dynamic data element corresponding to a conclusion of a term (e.g., expiration or termination) associated with the vehicle insurance policy. The year 519 can comprise a field that is populated by a dynamic data element corresponding to a production year of the vehicle. The make 521 can comprise a field that is populated by a dynamic data element corresponding to a manufacturer of the vehicle, and the model 532 can comprise a field that is populated by a dynamic data element corresponding to a particular type of vehicle produced by that manufacturer.

The graphic 525 can comprise a field that is populated by a dynamic data element corresponding to an image of the actual vehicle, whether the image was generated and provided by the insurance company to the electronic insurance card or captured and associated by the insured. The policy number 527 can comprise a field that is populated by a dynamic data element corresponding to a record number of the vehicle insurance policy. The claim phone number 529 can comprise a field that is populated by a dynamic data element corresponding to a telephone number that the insured may call when submitting a claim request. The roadside assistance phone number 531 can comprise a field that is populated by a dynamic data element corresponding to a telephone number that the insured may call when needing local assistance for the vehicle. In some embodiments, the claim phone number 529 and/or the roadside assistance phone number 531 can be selectable to trigger initiation of a phone call from user device (e.g., user devices 104).

The bar code 533 can comprise a field that is populated by a dynamic data element corresponding to a machine-readable representation of the electronic identification card 501, such as a line-based bar code or quick-response (QR) code. The vehicle identification number 535 can comprise a field that is populated by a dynamic data element corresponding to the Vehicle Identification Number (VIN), which is a unique identifying number that is assigned to a motor vehicle at the time of assembly. The option buttons 537, 539 can comprise fields that are populated by dynamic data elements corresponding to configurable icons, logos, etc., that are predefined by the insurance company. For example, one of the option buttons 537, 539 can be a "share" button that permits that transmitting of the electronic identification card 501.

Figure 6:
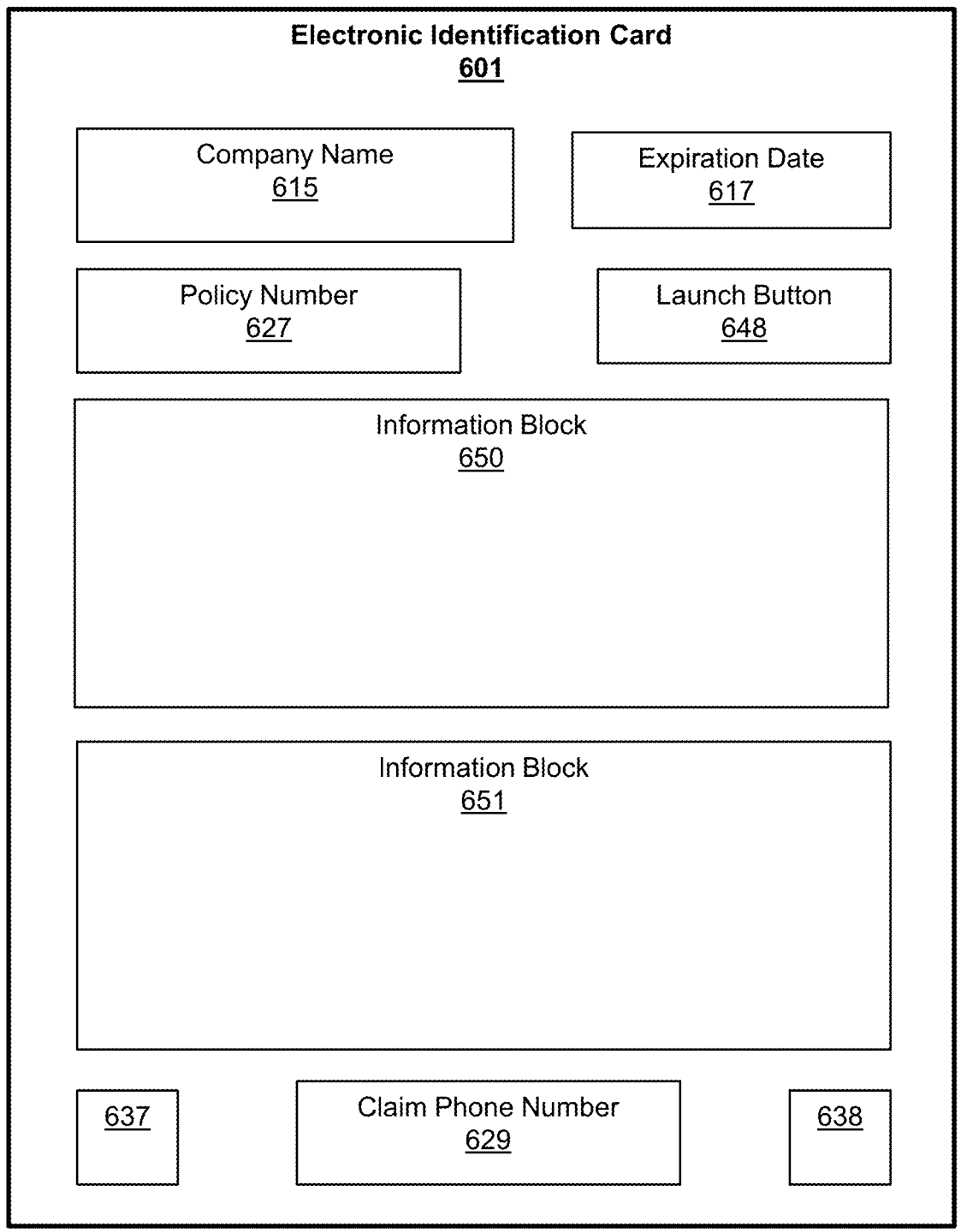
FIG. 6 depicts another example of a user interface according to some embodiments.
Figure 7:
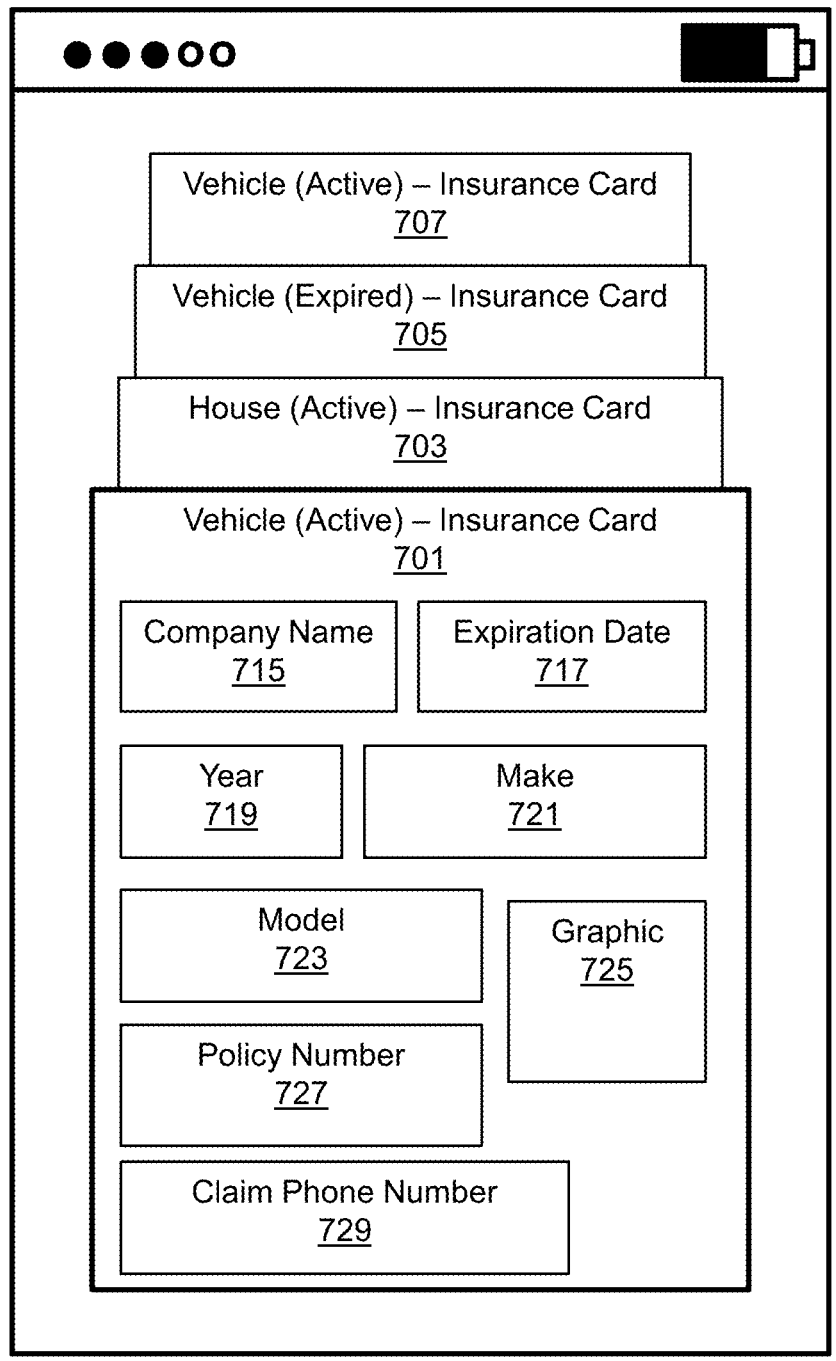
FIG. 7 depicts another example of a user interface according to some embodiments.
Figure 8:
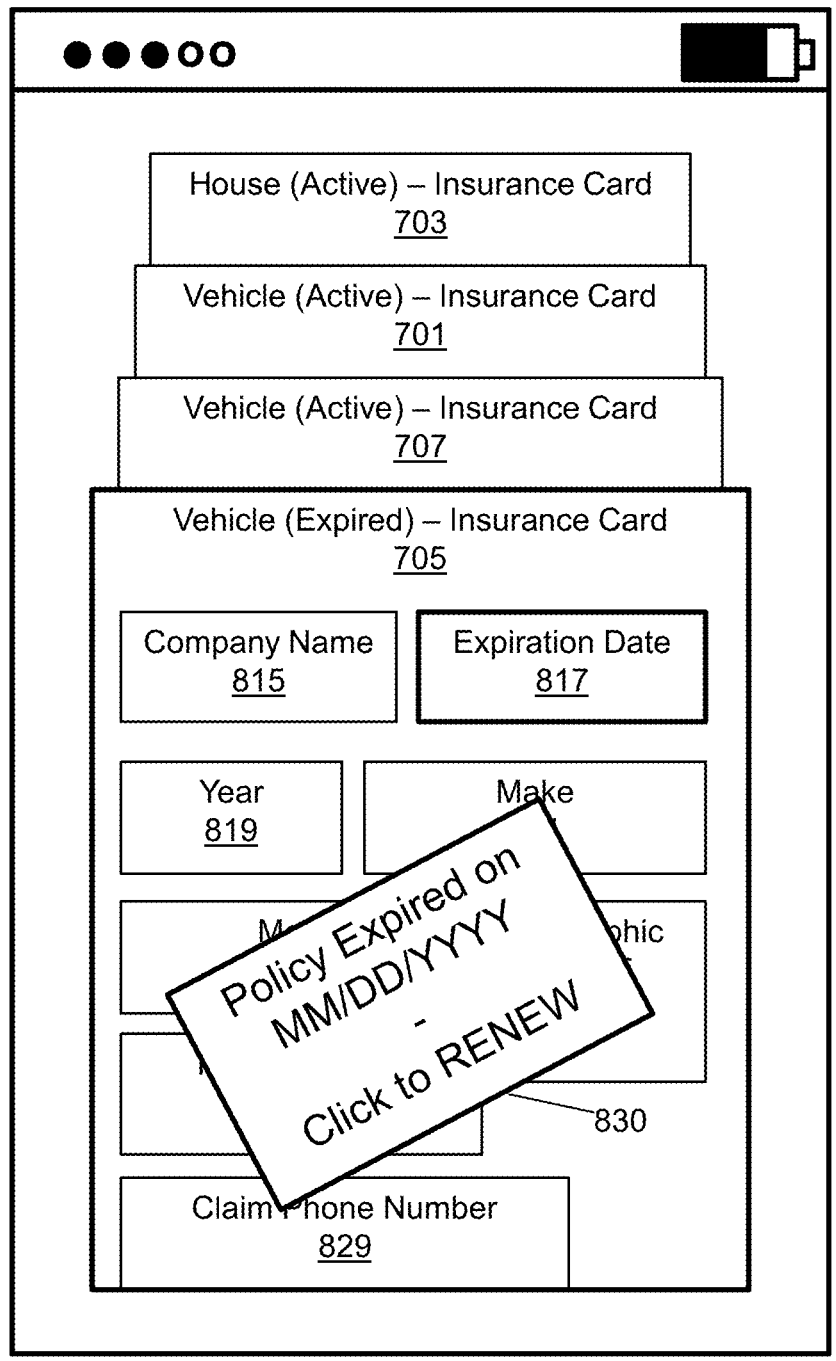
FIG. 8 depicts another example of a user interface according to some embodiments.

It will be understood that the user interface 500 of FIG. 5 and subsequently described user interfaces of FIGS. 6-8 are examples and that elements can be added or removed from these interfaces.

FIG. 6 depicts another example of a user interface 600 of the card management tool 114 of FIG. 1 according to some embodiments. The user interface 600 further depicts an electronic identification card 601. The electronic identification card 601 includes a plurality of policy element fields, where each policy element field is configured to present dynamic data elements specific to policy information for a specific policy and/or contract.

By way of example, the electronic identification card 601 comprises another electronic insurance card for the vehicle insurance policy. It will be understood that embodiments can be utilized to deliver and customize the electronic identification card 601 in association with other types of insurance, such as life insurance, health insurance, and other types of property and casualty insurance. In turn, the plurality of policy element fields can include a company name 615, an expiration date 617, a policy number 627, a claim phone number 629, option buttons 637, 638, a launch button 648, and information blocks 650, 651.

The company name 615 can comprise a field that is populated by a dynamic data element corresponding to the name of the insurance company providing the vehicle insurance policy to the insured. The expiration date 617 can comprise a field that is populated by a dynamic data element corresponding to a conclusion of a term (e.g., expiration or termination) associated with the vehicle insurance policy. The policy number 627 can comprise a field that is populated by a dynamic data element corresponding to a record number of the vehicle insurance policy. The claim phone number 629 can comprise a field that is populated by a dynamic data element corresponding to a telephone number that the insured may call when submitting a claim request. The options buttons 637, 638 can comprise fields that are populated by a dynamic data element corresponding to configurable icons, logos, etc., that are predefined by the insurance company. For example, one of the options buttons 637, 638 can comprise a "page" button that triggers the turning of the electronic identification card 601 to a subsequent page.

The launch button 648 can comprise a field that is populated by a dynamic data element corresponding to a deep link to a website, database service, or the like. As used herein, "deep link" means a hypertext link that links to a specific, generally searchable or indexed piece of web content on a website other than its home page. The launch button 648 can further provide password protected access to service capabilities via a pre-established token, a fingerprint identification (one-time authentication), security parameters, etc. In this way, insurance companies can trust that a person using the card management tool 114 or any user device 104 of FIG. 1 is the insured. An example of service capabilities includes viewing a previous bill, viewing a next bill, viewing a pay my bill window, accessing policy details, initiating a policy request, etc. The information blocks 650, 651 can comprise fields that are populated by a dynamic data element corresponding to configurable text, as designated by the insurance company.

With respect to FIG. 5 and FIG. 6, the user interfaces 500, 600 can comprise alternative examples of the same electronic identification card or opposing sides of the same electronic identification card. In regards to the latter configuration, the same electronic identification card can be multi-sided or include multiple pages where, for example, user interface 500 is a first side (e.g., page) and user interface 600 is a second side (e.g., page).

FIG. 7 depicts another example of a user interface 700 of the card management tool 114 of FIG. 1 according to some embodiments. User interface 700 is a simplified example of a home (e.g., main) screen where a current user can select from one or more menu options (e.g., multiple electronic identification cards).

By way of example, the user interface 700 illustrates four insurance cards 701, 703, 705, 707, each of which can include a plurality of policy element fields. As shown in FIG. 7, the insurance card 701 includes company name 715, expiration date 717, year 719, make 721, model 723, graphic 725, policy number 727, and claim phone number 729.

The company name 715 can comprise a field that is populated by a dynamic data element corresponding to the name of the insurance company providing the vehicle insurance policy to the insured. The expiration date 717 can comprise a field that is populated by a dynamic data element corresponding to a conclusion of a term (e.g., expiration or termination) associated with the vehicle insurance policy. The year 719 can comprise a field that is populated by a dynamic data element corresponding to a production year of the vehicle. The make 721 can comprise a field that is populated by a dynamic data element corresponding to a manufacturer of the vehicle, and the model 732 can comprise a field that is populated by a dynamic data element corresponding to a particular type of vehicle produced by that manufacturer. The graphic 725 can comprise a field that is populated by a dynamic data element corresponding to an image of the actual vehicle, whether the image was generated and provided by the insurance company to the electronic insurance card or captured and associated by the insured. The policy number 727 can comprise a field that is populated by a dynamic data element corresponding to a record number of the vehicle insurance policy. The claim phone number 729 can comprise a field that is populated by a dynamic data element corresponding to a telephone number that the insured may call when submitting a claim request.

FIG. 8 depicts another example of a user interface 800 of the card management tool 114 of FIG. 1 according to some embodiments. User interface 800 comprises a simplified example of a home (e.g., main) screen where a current user can select from one or more menu options (e.g., multiple electronic identification cards). The user interface 800 is an example, in the context of insurance companies, of how the management application 112 of FIG. 1 can push information to a user in accordance with real-time policy information.

By way of example, the user interface 800 illustrates the four insurance cards 701, 703, 705, 707 of FIG. 7, each of which can include a plurality of policy element fields. Further, FIG. 8 illustrates the insurance card 705 at a front of an insurance card stack and including a company name 815, an expiration date 817, a year 819, and a claim phone number 829. The company name 815 can comprise a field that is populated by a dynamic data element corresponding to the name of the insurance company providing the vehicle insurance policy to the insured. The expiration date 817 can comprise a field that is populated by a dynamic data element corresponding to a conclusion of a term (e.g., expiration or termination) associated with the vehicle insurance policy. The year 819 can comprise a field that is populated by a dynamic data element corresponding to a production year of the vehicle. The claim phone number 829 can comprise a field that is populated by a dynamic data element corresponding to a telephone number that the insured may call when submitting a claim request.

In addition, the user interface 800 includes an alert mechanism 830. The alert mechanism 830 comprises a tool for delivering and/or identifying information (or non-existence of the information) to the users responsible for a physical asset (and in some cases to the insurance company insuring the physical asset). Examples of notifications may include, but are not limited to, text messaging (e.g., short message service), audio alerts (e.g., telephone calls, cellphone calls, VoIP calls, voicemails, loudspeaker announcements, etc.), electronic mail (e.g., post office protocol, internet message access protocol, simple mail transfer protocol), interface/desktop alerts (e.g., dialog, balloon, modal window, pop-up, etc.), pager, instant messaging, and the like. Examples of information provided by the notification include indication of expired insurance policy, instruction to update policy data, and/or request to renew an insurance policy.

The alert mechanism 830 can comprise a warning of future events (e.g., 'this policy will expire at a future date'), an indication of a present state (e.g., 'this policy will expire today'), and/or an indication of a past event (e.g., 'this policy expired today'). As shown in FIG. 8, the alert mechanism 830 illustrates that the policy associated with the insurance card 705 has expired (e.g., "Policy Expired on MM/DD/YYYY"). In some embodiments, the insurance card 705 can be placed at the front of the insurance card stack through an automatic resorting that can draw user attention to the insurance card 705. Alternatively, the insurance card 705 can be placed at the front of the insurance card stack through user selection. The alert mechanism 830 can also include a deep link (e.g., "Click to RENEW") that enables a user to renew their policy regardless of which state the policy is in.

Figure 9:
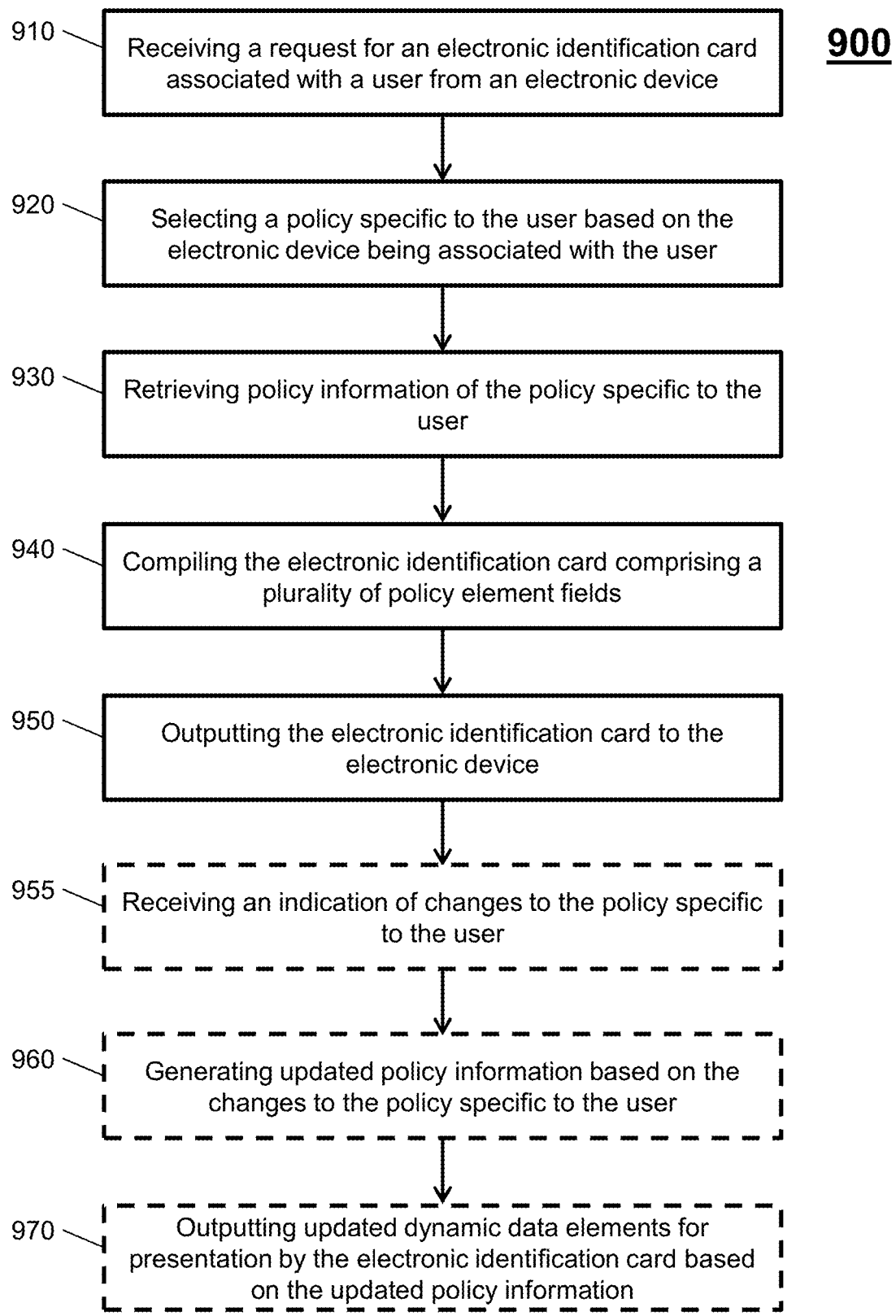
FIG. 9 depicts a process flow according to some embodiments.

Turning now to FIG. 9, a process flow 900 is depicted according to an embodiment. The process flow 900 includes a number of blocks/steps that may be performed in the depicted sequence or in an alternate sequence. The process flow 900 may be performed by the system 100 of FIG. 1. In one embodiment, the process flow 900 is performed by one of the management computer systems 102 of FIG. 1. The process flow 900 may be performed additionally or alternatively by one of the user devices 104 or other systems that communicate and/or present updated policy information via electronic identification cards, as further described below. The process flow 900 is further described with reference to FIGS. 1-8. The process flow 900 begins at block 910, where the management application 112 of one of the management computer systems 102 receives through a network interface 260 a request for an electronic identification card. The request for an electronic identification card may be received from a user device 104 that is associated with a user (e.g., an insured). The request can be initiated through a link on a website, a selection of a link in a message, scanning of a code (e.g., a bar code on an advertisement) by the user device 104, accessing of a previously generated electronic identification card, etc. The electronic identification card may be an insurance identification card.

Next, at block 920, the management application 112 selects a policy. The policy can be specific to the insured associated with the user device 104, and thus can be an insurance policy associated with a vehicle. Then, at block 930, the management application 112 retrieves policy information of the policy specific to the insured. In general, the retrieving of the policy information may be in response to the receiving of the request and to the selecting of the policy specific to the user. The policy information may be accessed from local storage of the management computer system 102 and/or retrieved from a database 110.

Next, at block 940, the management application 112 compiles the electronic identification card. For instance, the management application 112 can compile the electronic identification card in accordance with the retrieved policy information by determining each dynamic data element for each policy element field based on the retrieving of the policy information. The electronic identification card can include a plurality of policy element fields, where each policy element field is configured to present dynamic data elements specific to the user based on the retrieved policy information.

In some embodiments, the management application 112 can generate, as a first dynamic data element of the dynamic data elements specific to the user, a deep link. The deep link can further be operable to enable authentication between the management computer system 102 and the user device 104 associated with the insured. The deep link can also, in accordance with the authentication, enable direct access to portions of the policy information that are secured.

In some embodiments, the management application 112 can detect a current location of the user device 104 associated with the user. Then, based on the current location, the management application 112 can generate, as a first dynamic data element of the dynamic data elements specific to the user, localized information based on the current location. This localized information can be localized informational tips that populate, e.g., the roadside assistance phone number 531 of FIG. 5 or the information blocks 650, 651 of FIG. 6. That is, the management application 112 can provide a phone number of a business local to the current location of the user device 104 associated with the user in the roadside assistance phone number 531 of FIG. 5. The management application 112 can also provide a link to a website of the business local to the current location of the user device 104 in the information block 650. The management application 112 can also provide a deep link in the information block 651 to a claim service portion of a website of the insurance company administering the insurance policy, where the claim service portion is associated with a region of the current location of the user device 104.

Next, at block 950, the management application 112 outputs (e.g., transmits, sends) the electronic identification card to the user device 104. In this way, the electronic identification card can be received and stored locally by the user device 104 as the electronic identification card 116 of FIG. 1.

In addition, the process flow 900 may optionally include updating and outputting operations, where the management application 112 utilizes updated policy information to reconfigure the electronic identification card 116 at blocks 955, 960, and 970. That is, the management application 112 may receive, from the electronic device associated with the user, an indication of changes to the policy specific to the user, as indicated in block 955. The management application 112 can generate updated policy information (e.g., update the policy information based on the changes to the policy specific to the user), as indicated in block 960, and can output to the user device 104 updated dynamic data elements for presentation by the electronic identification card 116 based on the updated policy information, as indicated in block 970.

Figure 10:
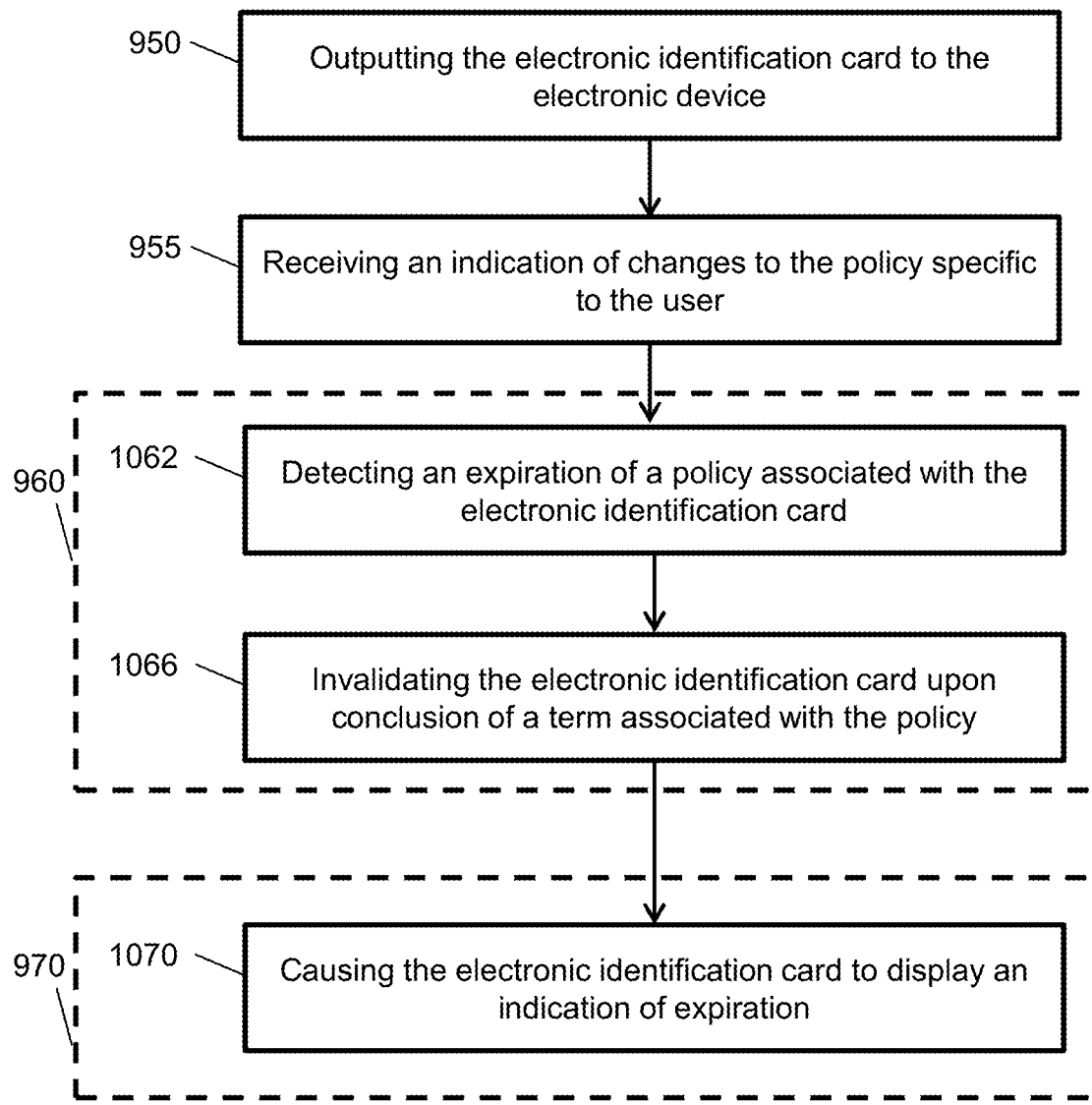
FIG. 10 depicts another process flow according to some embodiments.

Blocks 960 and 970 are further described with respect to a process flow 1001 of FIG. 10 in accordance with an embodiment. The process flow 1001 describes operations that can support the receiving of the first input at block 810 by the card management tool 114. The process flow 1001 includes a number of blocks/steps that may be performed in the depicted sequence or in an alternate sequence. The process flow 1001 may be performed by the system 100 of FIG. 1. In one embodiment, the process flow 1001 is performed by one of the computer systems 102 of FIG. 1;

however, the process flow 1001 may be performed by one of the user devices 104 or other systems that communicate and/or present updated policy information via electronic identification cards, as further described below. The process flow 1001 is further described with reference to FIGS. 1-9.

The process flow 1001 begins at block 950, where the management application 112 outputs the electronic identification card 116 to the user device 104. In this example, the insurance card 705 of FIGS. 7 and 8 will be utilized in the following description.

Next, process flow 1001 proceeds to blocks 1062 and 1066, which are included in inside block 960. Thus, to generate updated policy information based on changes to the policy specific to the user, the management application 112 at block 1062 can detect an expiration of a policy associated with the electronic identification card. The updated policy information may include a renewal of the policy specific to the user, an expiration of the policy specific to the user, an update to a term of the policy specific to the user, an update to user information of the policy information, etc. Further, the management application 112, at block 1066 can invalidate the electronic identification card 715 upon conclusion of a term associated with the policy.

Next, process flow 1001 proceeds to block 1070, which is included in inside block 970. Thus, when the management application 112 outputs to the user device 104 updated dynamic data elements for presentation by the electronic identification card 116 based on the updated policy information, the management application 112 can cause the electronic identification card 715 to display an indication of expiration, such as the alert mechanism 830 of FIG. 8. In this way, upon invalidating the electronic identification card 715 based on a conclusion of a term of the policy, the management application 112 can send updated policy information indicating the invalidation to the user device 104 and cause an indication of expiration to be presented by the identification card 715.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer readable storage medium may be a tangible medium containing or storing a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The computer readable medium may contain program code embodied thereon, which may be transmitted using any medium, including but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present invention are described herein with reference to flowchart illustrations and/or block diagrams of methods, apparatus (systems) and computer program products according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:
    a processing device;
    a network interface configured to access a policy database through a network; and
    a memory device in communication with the processing device, the memory device storing instructions that when executed by the processing device result in:
        receiving, from an electronic device associated with a user, a request for an electronic identification card;
        selecting, from the policy database through the network, a policy specific to the user based on the electronic device being associated with the user;
        retrieving policy information of the policy specific to the user in response to the receiving of the request for the electronic identification card and to the selecting of the policy specific to the user;
        compiling, in real-time, the electronic identification card, comprising a plurality of policy element fields, each policy element field configured to present dynamic data elements specific to the user based on the policy information;
        generating, as a first dynamic data element of the dynamic data elements specific to the user, a first deep link operable to enable authentication between the system and the electronic device associated with the user and, in accordance with the authentication, to enable direct access to portions of the policy information that are secured;
        outputting, to the electronic device associated with the user, the electronic identification card;
        receiving, from the electronic device associated with the user, an indication of changes to the policy specific to the user;
        generating updated policy information based on the changes to the policy specific to the user;
        outputting, to the electronic device associated with the user, updated dynamic data elements for presentation by the electronic identification card based on the updated policy information;
        monitoring for a future event associated with the policy specific to the user; and
        outputting an alert mechanism based on detecting a notification of the future event as an overlay on the electronic identification card, the overlay comprising a second deep link to modify a state of the policy specific to the user and update at least one of the dynamic data elements of the electronic identification card.

2. The system of claim 1, wherein the updated policy information comprises information associated with a renewal or an expiration of the policy specific to the user.

3. The system of claim 1, wherein the updated policy information comprises an update to at least one of a term of the policy specific to the user and user information of the policy information.

4. The system of claim 1, further comprising instructions, with respect to the generating of the updated policy information based on the changes to the policy specific to the user, that when executed by the processing device result in:
    invalidating the electronic identification card upon conclusion of a term associated with the policy specific to the user, the updated policy information comprising information indicating the invalidating of the electronic identification card and causing an indication of expiration to be presented by the identification card upon receipt of the updated dynamic data elements by the electronic device associated with the user.

5. The system of claim 1, wherein at least a portion of the dynamic data elements comprise a plurality of deep links operable to enable direct access to the policy specific to the user.

6. The system of claim 1, further comprising instructions, with respect to the compiling of the electronic identification card, that when executed by the processing device result in:
    detecting a current location of the electronic device associated with the user; and
    generating, as a first dynamic data element of the dynamic data elements specific to the user, a localized informational tip based on the current location.

7. The system of claim 6, further comprising instructions, with respect to the generating of the localized informational tip based on the current location, that when executed by the processing device result in:
    selecting the localized informational tip from a list comprising:
        a phone number of a business local to the current location of the electronic device associated with the user,
        a link to a website of the business local to the current location of the electronic device associated with the user, and
        a deep link to a claim service portion of a website of an administrator of the policy, the claim service portion being associated with a region that comprises the current location of the electronic device associated with the user.

8. The system of claim 1, further comprising instructions, with respect to the compiling of the electronic identification card, that when executed by the processing device result in:
    determining each dynamic data element for each policy element field based on the retrieving of the policy information.

9. The system of claim 1, wherein the request is initiated via at least one of a selection of a link on a website, a selection of a link in a message, a scanning of a code by the electronic device, and an accessing of a previously generated electronic identification card.

10. The system of claim 1, wherein the electronic identification card is transferable via a message sent from the electronic device associated with the user to a second electronic device.

11. The system of claim 1, wherein the electronic device associated with the user comprises a plurality of electronic devices,
   wherein the electronic identification card comprises a plurality of electronic identification cards,
   wherein each card corresponds to and is stored by a respective one of the plurality of electronic devices, and
   further comprising instructions that when executed by the processing device result in:
      synchronizing the plurality of electronic identification cards across the plurality of electronic devices to ensure that each card presents the updated dynamic data elements specific to the user based on the updated policy information; and
      sorting a stack of the electronic identification cards on the electronic devices to place the electronic identification card associated with the alert mechanism in front of the stack of the electronic identification cards on the electronic devices based on detecting the notification of the future event.

12. The system of claim 1, wherein the electronic identification card comprises an insurance identification card, and
   wherein the policy specific to the user comprises an insurance policy associated with a vehicle.

13. A computer program product comprising a computer readable storage medium having program instructions embodied therewith the program instructions executable by a processor coupled to a network interface to cause the processor to implement:
   receiving, from an electronic device associated with a user, a request for an electronic identification card;
   selecting, from a policy database through a network accessible by the network interface, a policy specific to the user based on the electronic device being associated with the user;
   retrieving policy information of the policy specific to the user in response to the receiving of the request for the electronic identification card and to the selecting of the policy specific to the user;
   compiling, in real-time, the electronic identification card comprising a plurality of policy element fields, each policy element field configured to present dynamic data elements specific to the user based on the policy information;
   generating, as a first dynamic data element of the dynamic data elements specific to the user, a first deep link operable to enable authentication between the system and the electronic device associated with the user and, in accordance with the authentication, to enable direct access to portions of the policy information that are secured;
   outputting, to the electronic device associated with the user, the electronic identification card;
   receiving, from the electronic device associated with the user, an indication of changes to the policy specific to the user;
   generating updated policy information based on the changes to the policy specific to the user;
   outputting, to the electronic device associated with the user, updated dynamic data elements for presentation by the electronic identification card based on the updated policy information;
   monitoring for a future event associated with the policy specific to the user; and
   outputting an alert mechanism based on detecting a notification of the future event as an overlay on the electronic identification card, the overlay comprising a second deep link to modify a state of the policy specific to the user and update at least one of the dynamic data elements of the electronic identification card.

14. The computer program product of claim 13, wherein the updated policy information comprises information associated with a renewal or an expiration of the policy specific to the user.

15. The computer program product of claim 13, wherein the updated policy information comprises an update to at least one of a term of the policy specific to the user and to user information of the policy information.

16. The computer program product of claim 13, further comprising program instructions, with respect to the generating of the updated policy information based on the changes to the policy specific to the user, that when executed by the processor cause the processor to implement:
   invalidating the electronic identification card upon conclusion of a term associated with the policy specific to the user, the updated policy information comprising information indicating the invalidating of the electronic identification card and causing an indication of expiration to be presented by the identification card upon receipt of the updated dynamic data elements by the electronic device associated with the user.

17. The computer program product of claim 13, wherein at least a portion of the dynamic data elements comprise a plurality of deep links operable to enable direct access to the policy specific to the user.

18. The computer program product of claim 13, further comprising program instructions, with respect to the compiling of the electronic identification card, that when executed by the processor cause the processor to implement:
   detecting a current location of the electronic device associated with the user; and
   generating, as a first dynamic data element of the dynamic data elements specific to the user, a localized informational tip based on the current location.

19. The computer program product of claim 18, further comprising instructions, with respect to the generating of the localized informational tip based on the current location, that when executed by the processing device result in:
   selecting the localized informational tip from a list comprising:
      a phone number of a business local to the current location of the electronic device associated with the user,
      a link to a website of the business local to the current location of the electronic device associated with the user, and
      a deep link to a claim service portion of a website of an administrator of the policy, the claim service portion being associated with a region that comprises the current location of the electronic device associated with the user.

20. The computer program product of claim 13, further comprising program instructions, with respect to the compiling of the electronic identification card, that when executed by the processor cause the processor to implement:

determining each dynamic data element for each policy element field based on the reading of the policy information.

21. The computer program product of claim 13, wherein the request is initiated via at least one of a selection of a link on a website, a selection of a link in a message, a scanning of a code by the electronic device, and an accessing of a previously generated electronic identification card.

22. The computer program product of claim 13, wherein the electronic identification card is transferable via a message sent from the electronic device associated with the user to a second electronic device.

23. The computer program product of claim 13, wherein the electronic device associated with the user comprises a plurality of electronic devices,
   wherein the electronic identification card comprises a plurality of electronic identification cards,
   wherein each card corresponds to and is stored by a respective one of the plurality of electronic devices, and
   further comprising program instructions that when executed by the processor cause the processor to implement:
   synchronizing the plurality of electronic identification cards across the plurality of electronic devices to ensure that each card presents the updated dynamic data elements specific to the user based on the updated policy information; and
   sorting a stack of the electronic identification cards on the electronic devices to place the electronic identification card associated with the alert mechanism in front of the stack of the electronic identification cards on the electronic devices based on detecting the notification of the future event.

24. The computer program product of claim 13, wherein the electronic identification card comprises an insurance identification card, and
   wherein the policy specific to the user comprises an insurance policy associated with a vehicle.

\* \* \* \* \*